(12) United States Patent
Xu et al.

(10) Patent No.: US 9,147,291 B2
(45) Date of Patent: Sep. 29, 2015

(54) METHOD AND APPARATUS OF PROCESSING DATA TO SUPPORT AUGMENTED REALITY

(71) Applicant: Samsung Electronics Co. Ltd., Suwon-si, Gyeonggi-do (KR)

(72) Inventors: Yiling Xu, Suwon-si (KR); Sung-Ryeul Rhyu, Yongin-si (KR); Kyung-Mo Park, Seoul (KR); Jae-Yeon Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 342 days.

(21) Appl. No.: 13/866,372

(22) Filed: Apr. 19, 2013

(65) Prior Publication Data

US 2013/0278634 A1    Oct. 24, 2013

Related U.S. Application Data

(60) Provisional application No. 61/636,082, filed on Apr. 20, 2012, provisional application No. 61/636,836, filed on Apr. 23, 2012.

(51) Int. Cl.
  *G09G 5/00*     (2006.01)
  *G06T 19/00*    (2011.01)

(52) U.S. Cl.
  CPC ........... *G06T 19/006* (2013.01); *G06T 2210/61* (2013.01)

(58) Field of Classification Search
  CPC ..................... G06T 19/006; G06T 2210/61
  See application file for complete search history.

(56) References Cited

U.S. PATENT DOCUMENTS

| 7,301,547 B2 | 11/2007 | Martins et al. |
| 2002/0070952 A1* | 6/2002 | Hoch ............................ 345/647 |
| 2007/0247525 A1* | 10/2007 | Samarasekera et al. ...... 348/159 |
| 2012/0075341 A1 | 3/2012 | Sandberg |
| 2012/0081529 A1 | 4/2012 | Seo |

FOREIGN PATENT DOCUMENTS

| KR | 10-2011-0119146 A | 11/2011 |
| KR | 10-2012-0035036 A | 4/2012 |
| WO | 2012/007764 A1 | 1/2012 |

OTHER PUBLICATIONS

International Organization for Standardization and International Electrotechnical Commission, International Standard ISO/IEC 14496-1, Aug. 2002, pp. 1-30.*

* cited by examiner

*Primary Examiner* — Charles Tseng
(74) *Attorney, Agent, or Firm* — Jefferson IP Law, LLP

(57) ABSTRACT

A method and apparatus of processing data to support Augmented Reality (AR) are provided. In the method, an image file including at least a scene description stream, an object descriptor stream, and a visual stream including a real-world medium is received, the scene description stream including an AR node that represents information about at least one piece of AR content used to augment the real-world medium, information about an AR locator and an object descriptor Identifier (ID) is acquired from the AR node, the AR locator describing when the at least one piece of AR content appears and how the real-world medium is augmented with the at least one piece of AR content and the object indicator ID identifying an Object Descriptor (OD) that describes the at least one piece of AR content, and at least one elementary stream descriptor.

14 Claims, 10 Drawing Sheets

METHOD AND APPARATUS OF PROCESSING DATA TO SUPPORT AUGMENTED REALITY

CROSS-REFERENCE TO RELATED APPLICATIONS

This application claims the benefit under 35 U.S.C. §119 (e) of a U.S. Provisional application filed on Apr. 20, 2012 in the U.S. Patent and Trademark Office and assigned Ser. No. 61/636,082 and a U.S. Provisional application filed on Apr. 23, 2012 in the U.S. Patent and Trademark Office and assigned Ser. No. 61/636,836, the entire disclosure of each of which is hereby incorporated by reference.

BACKGROUND OF THE INVENTION

1. Field of the Invention

The present invention relates to a data processing method and apparatus. More particularly, the present invention relates to a method and apparatus of processing image file data to support Augmented Reality (AR).

2. Description of the Related Art

AR is a technology that provides a display of virtual objects overlaid on objects of the real world. AR is also called mixed reality in that a virtual world image, having specific information included therein, is combined with a real world image in real time and the composite of the two images is displayed. In other words, AR is a hybrid virtual reality system that combines the real environment with a virtual environment.

In AR, which supplements the real world with the virtual world, the virtual world is built by computer graphics. However, the main subject of AR is the real environment. The computer graphics provide additional information that supplements the real environment. That is, AR blurs the distinction between the real environment and a virtual screen by overlaying a Three-Dimensional (3D) virtual image on a real image that is viewed by the user.

Virtual reality technology draws a user into the virtual environment so that the real environment is not perceivable to the user. However, the AR technology that mixes the real environment with virtual objects allows the user to view the real environment, thus offering an enhanced sense of reality and additional information. For example, a Two-Dimensional (2D) or 3D image of the location, phone number, etc. of a shop may be overlaid on an image captured by a smartphone camera.

The AR technology may be used in a variety of distinct applications such as remote medical diagnosis, broadcasting, architecture design, manufacturing process management, etc. Along with the recent growth of smartphones, the AR technology has been actively commercialized and its application range is expanded to location-based services, mobile games, mobile solutions, education, etc.

Given the broad range of applications, there is a need for an apparatus and a method for managing and processing data to support AR.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus of managing and processing data to support Augmented Reality (AR).

Another aspect of the present invention is to provide a file framework including information about AR content.

A further aspect of the present invention is to provide a method and apparatus of supporting transmission and storage of AR content in order to implement AR.

In accordance with an aspect of the present invention, a method of processing data to support AR is provided. In the method, an image file including at least a scene description stream, an object descriptor stream, and a visual stream including a real-world medium is received, the scene description stream including an AR node that represents information about at least one piece of AR content used to augment the real-world medium, information about an AR locator and an object descriptor Identifier (ID) is acquired from the AR node, the AR locator describing when the at least one piece of AR content appears and how the real-world medium is augmented with the at least one piece of AR content and the object indicator ID identifying an Object Descriptor (OD) that describes the at least one piece of AR content, at least one elementary stream descriptor that is associated with each elementary stream carrying the at least one piece of AR content and includes an ID of the at least one piece of AR content is acquired from the OD identified by the object descriptor ID, at least one elementary stream carrying the at least one piece of AR content is accessed based on the at least one elementary stream descriptor, and the real-world medium is augmented with AR content selected from the at least one piece of AR content and output.

In accordance with another aspect of the present invention, an apparatus of processing data to support AR is provided. The apparatus includes a receiver configured to receive an image file including at least a scene description stream, an object descriptor stream, and a visual stream including a real-world medium, the scene description stream including an AR node that represents information about at least one piece of AR content used to augment the real-world medium, a processor configured to acquire, from the AR node, information about an AR locator and an object descriptor ID, the AR locator describing when the at least one piece of AR content appears and how the real-world medium is augmented with the at least one piece of AR content and the object indicator ID identifying an object descriptor that describes the at least one piece of AR content, to acquire, from the OD identified by the object descriptor ID, at least one elementary stream descriptor that is associated with each elementary stream carrying the at least one piece of AR content and includes an ID of the at least one piece of AR content, and to access at least one elementary stream carrying the at least one piece of AR content based on the at least one elementary stream descriptor, and a display configured to augment the real-world medium with AR content selected from the at least one piece of AR content and to output the augmented real-world medium.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
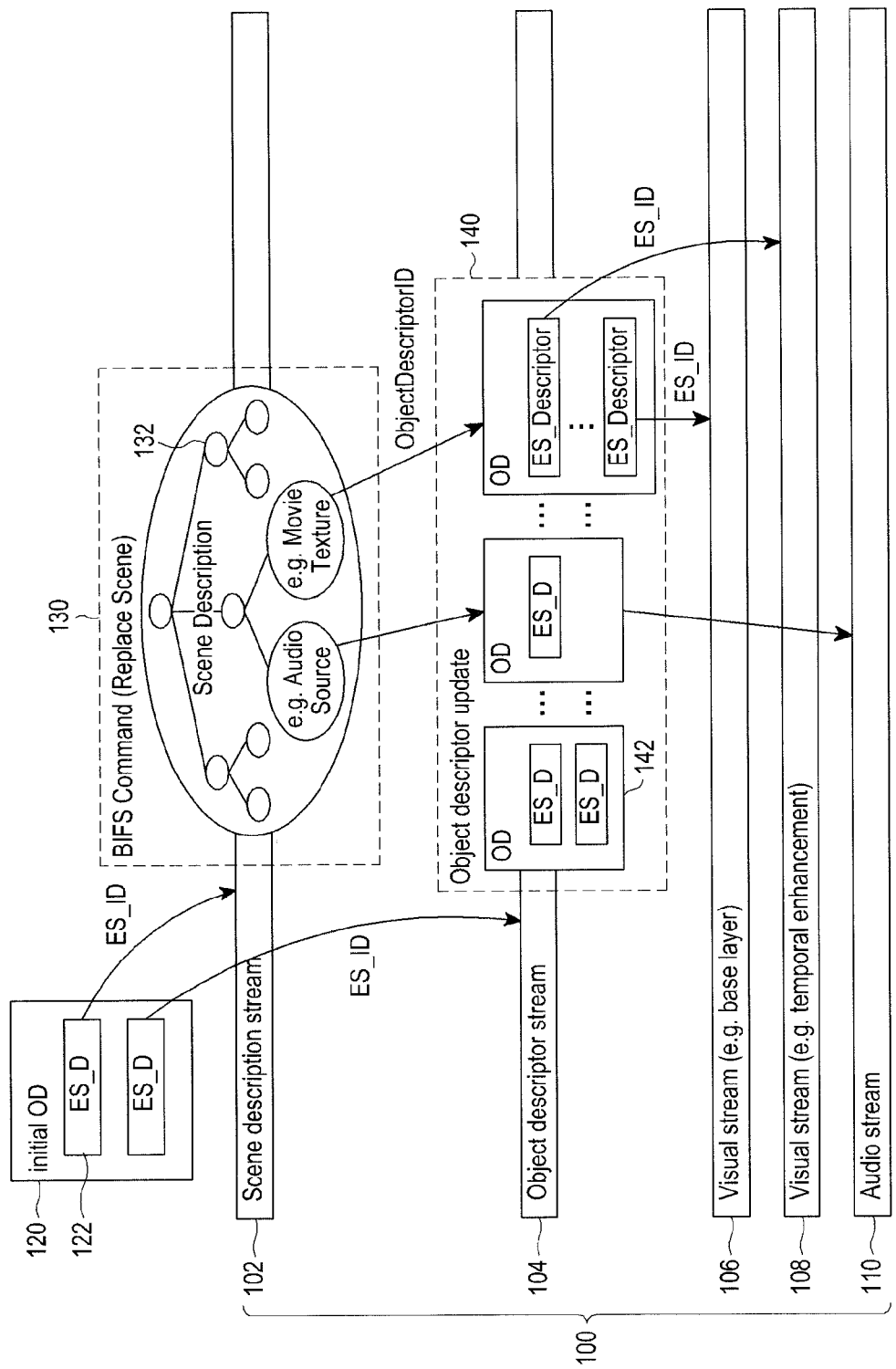
FIG. 1 illustrates an available file framework to implement Augmented Reality (AR) according to an exemplary embodiment of the present invention.

FIG. 1 illustrates a file framework available to implement Augmented Reality (AR) according to an exemplary embodiment of the present invention.

Referring to FIG. 1, a framework 100 provides a scene description stream 102, an object descriptor stream 104, and audio and/or visual streams 106, 108 and 110. The elementary streams 102, 104, 106, 108 and 110 that convey streaming data of audio and/or visual objects as well as streaming data of scene descriptions are basic building blocks of the International Organization for Standardization/International Electrotechnical Commission (ISO/IEC) 14496-1 standard. Elementary stream descriptors 122 included in an initial object descriptor 120 indicates one or more initial scene description streams 102 and object descriptor streams 104 corresponding to the initial scene description streams 102.

The scene description stream 102 is an elementary stream carrying a Binary Format For Scene (BIFS) command that represents scene descriptions 130. The scene descriptions 130 include information that describes the spatial-temporal positioning/relationship of media objects (the audio or visual objects included in the media streams 106, 108 and 110), behaviors resulting from the objects, and user interactions. Each scene description 130 includes nodes 132 in a coded hierarchical tree structure, wherein each node 132 represents attributes and other information. End nodes correspond to media nodes such as specific audio or visual objects and middle nodes correspond to scene description nodes related to grouping, conversion, and other operations in the tree.

The object descriptor stream 104 is an elementary stream carrying object descriptors 140. The object descriptors 140 provide links between the scene description stream 102 and the elementary streams 106, 108 and 110.

While the scene description stream 102 declares the spatial-temporal relationship between audio-visual objects, the object descriptor stream 104 specifies elementary stream resources that provide time-varying data for scenes. This indirection facilitates independent changes to the scene structure, the properties of the elementary streams 106, 108 and 110 (e.g. encoding of the elementary streams) and their delivery.

The object descriptor stream 104 contains a set of descriptors that allows to identify, to describe and to properly associate the elementary streams 106, 108 and 110 with each other and with audio-visual objects used in the scene descriptions 130. Identifiers (IDs), 'ObjectDescriptorIDs' associate object descriptors 140 with appropriate nodes 132 in the scene descriptions 130. The object descriptors 140 are themselves conveyed in elementary streams to allow time stamped changes to an available set of object descriptors.

Each object descriptor 140 contains a set of Elementary Stream Descriptors (ES_Ds) 142 that is associated with one node and describes one or more elementary streams associated generally with one audio or visual object. Each object descriptor 140 may provide a description of scalable content as well as multiple alternative streams carrying the same content with multiple qualities or in different languages, for example.

An elementary stream descriptor 142 included in the object descriptor 140 identifies one corresponding elementary stream, that is, one of the elementary streams 106, 108 and 110 using an ID, ES_ID. The elementary stream descriptor 142 contains information needed to initiate and configure a decoding process for the elementary stream as well as information needed to identify Intellectual Property (IP). Optionally, additional information may be associated with one elementary stream and the most significant service requirements or language indications for transmission of the elementary stream descriptor 142. The object descriptors 140 and the elementary stream descriptors 142 may all point remote object descriptors or remote elementary stream sources using Uniform Resource Locators (URLs).

AR applications refer to a view of a Real-World Environment (RWE) whose elements are augmented by content, such as graphics or sound, in a computer driven process.

AR is a new trend in various service areas such as advertising, entertainment, education, etc. and in platforms such as mobile terminals, tablets, Personal Computers (PCs), TeleVisions (TVs), etc. The 2D/3D graphics are integrated into the real world in order to enhance user experience and enrich information.

Figure 2:
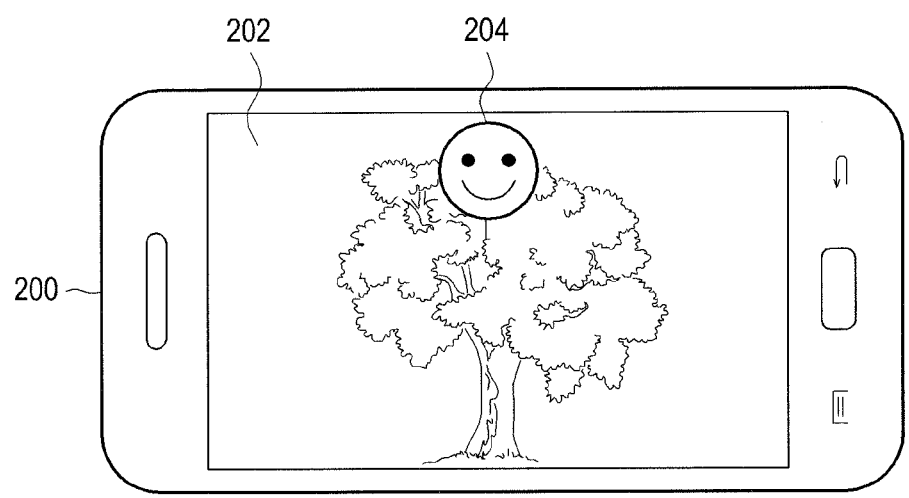
FIG. 2 illustrates an example of AR according to an exemplary embodiment of the present invention.

FIG. 2 illustrates an example of AR according to an exemplary embodiment of the present invention.

Referring to FIG. 2, there is a visual object 202 such as a video/image of a tree captured from the real world. A virtual object 204 of a 'smiling face', that is, AR content augments the visual object 202. An AR 200 is a composite of the visual object 202 and the virtual object 204.

A file framework designed to support AR according to an exemplary embodiment of the present invention provides information about the relationship between AR content for AR and a visual object to be augmented by the AR content.

Figure 3:
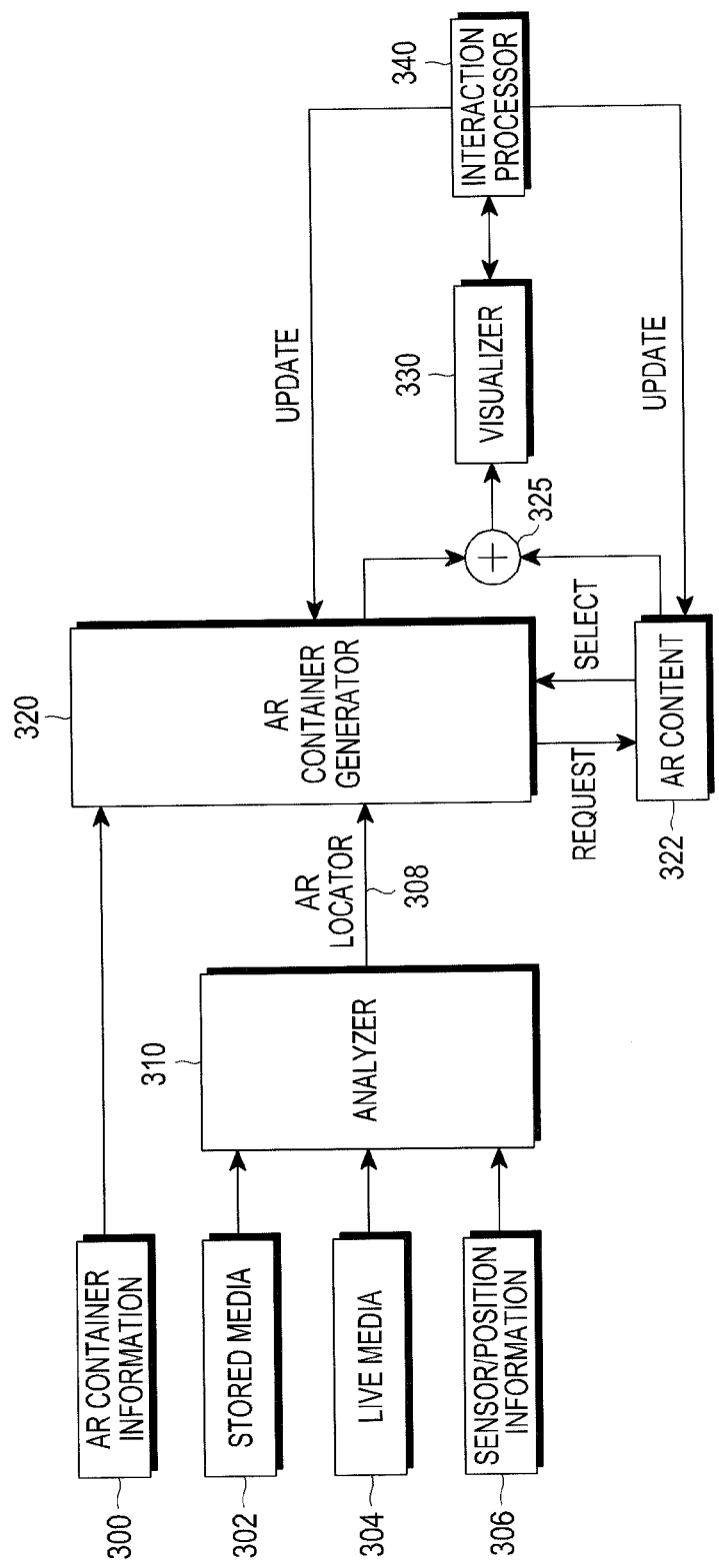
FIG. 3 illustrates an application model to support AR according to an exemplary embodiment of the present invention.

FIG. 3 illustrates an application model to support AR according to an exemplary embodiment of the present invention.

Referring to FIG. 3, in execution of an application supporting AR, the application may read a medium 302 stored in a memory, capture a live medium 304 with a camera, or sense sensor/location information 306 using a sensor or Global Positioning System (GPS). In general, the stored medium 302 and the live medium 304 captured by the camera do not include their AR locators. Accordingly, an analyzer 310 analyzes the stored medium 302, the live medium 304 or the sensor information 306 and thus generates an AR locator 308 for the stored medium 302, the live medium 304 or the sensor information 306.

The AR locator 308 specifies a place and a time in which visual objects to augment a real-world object appear and how to control the real-world object and the visual objects. An AR control field that may be included in the AR locator 308 or may be separately provided describes AR context to be mixed with the real-world object and when the virtual objects appear and disappear in the AR content.

An AR container generator 320 is an AR player or browser that generates an AR container containing a real-world object such as the stored medium 302, the live medium 304 or the sensor information 306, and the AR locator 308. In an exemplary embodiment, the AR container may be configured preliminarily and input to the AR container generator 320, as indicated by reference numeral 300, rather than the AR container being generated in the AR container 320. In another exemplary embodiment, a medium and an AR container may be generated together and the AR container generator 320 may use the medium and the AR container directly.

AR content 322 includes information about at least one virtual object to augment a real-world object and an interaction between users and the virtual object. Each virtual object may be, for example, 2D or 3D graphics and/or texture, an audio, an image/video, etc. and the interaction information may be, for example, a haptic effect.

The AR content 322 may be provided in combination with the AR locator 308 to the AR container generator 320 or generated in the AR container generator 320. In another exemplary embodiment, the AR container generator 320 may generate a request format describing a virtual object needed at a given time, transmit the request format to a local memory or server (not shown), and read or receive the AR content 322 in response to the request format.

A compositor 325 generates an AR object by augmenting a real-world object 302, 304 or 306 of the AR container 320 with a virtual object of the AR content 322. The AR object may be rendered on a screen after being visualized by a visualizer 330. An interaction processor 340 generates an updated information format by sensing a user gesture such as a touch on the screen, provides the updated information format to the AR container 320 and/or the AR content 322, and thus controls the visualizer 330 so that an updated AR object may be visualized.

The AR locator 308 may be defined using a BIFS or by another manner. While a BIFS is taken as an example herein, this does not limit the present invention.

Figure 4:
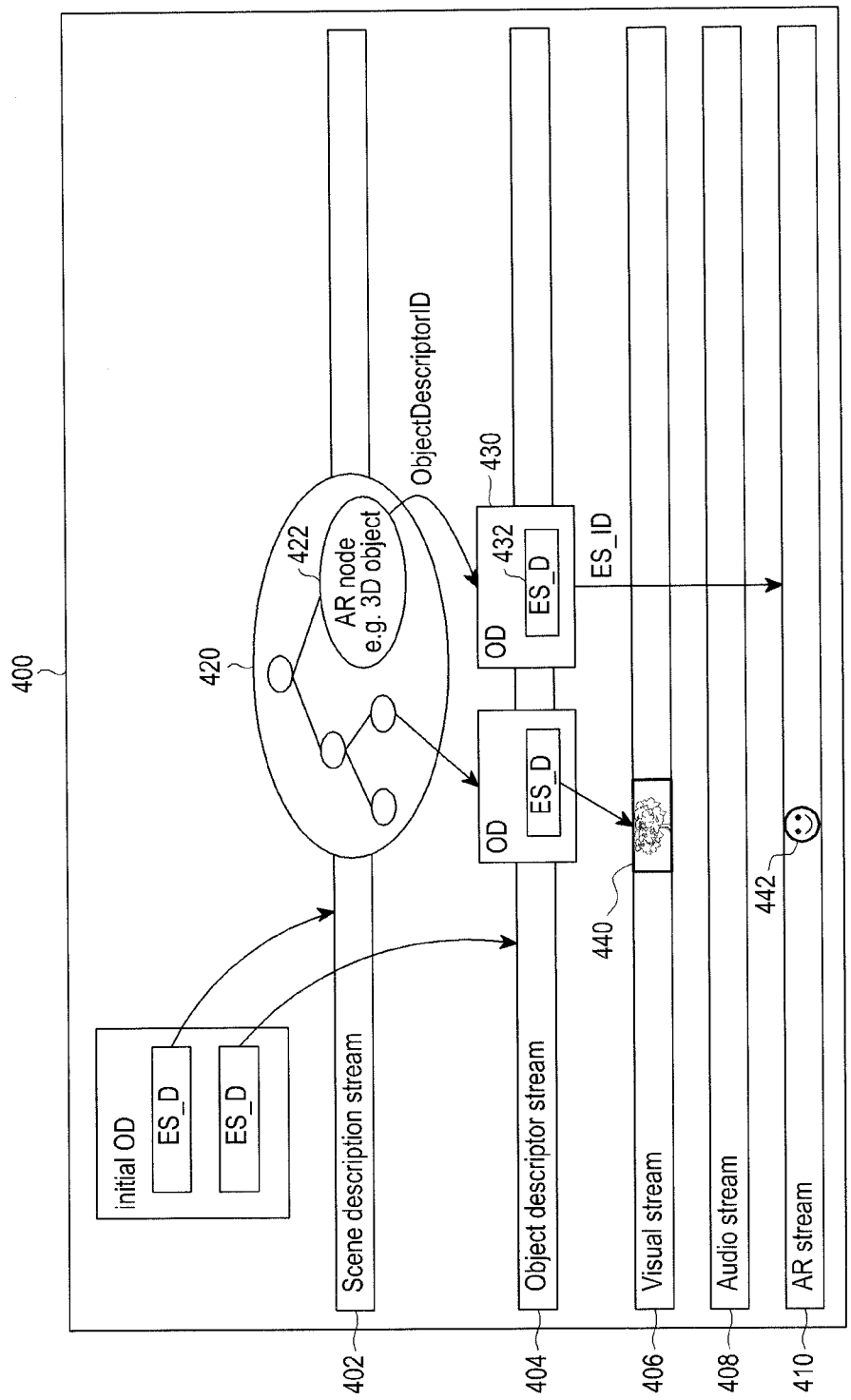
FIG. 4 illustrates a file framework to provide an AR locator according to an exemplary embodiment of the present invention.

FIG. 4 illustrates a file framework to provide an AR locator according to an exemplary embodiment of the present invention.

Referring to FIG. 4, a file framework 400 includes a scene description stream 402, an object descriptor stream 404, audio and/or visual streams 406 and 408, and an AR stream 410.

A scene description 420 in the scene description stream 402 includes an AR node 422 that provides information about an AR locator. The AR node 422 describes when AR content 442 appears and how a real-world medium 440 is augmented by the AR content 442. The AR content 442 provided from the AR locator is described by an object descriptor 430 identified by ObjectDescriptorID. That is, the object descriptor 430 includes an Elementary Stream Descriptor (ES_D) 432 indicating at least one elementary stream 410 that carries the AR content 442 for the AR node 422 and the elementary stream descriptor 432 includes information about the AR stream 410 carrying the AR content 442.

One AR locator may provide one or more pieces of AR content. That is, the AR locator may select one of various pieces of AR content. One or more pieces of AR content may be overlapped with one another in the same AR locator or different pieces of AR content may appear successively in the AR locator. That is, different pieces of AR content are provided in the AR locator.

Figure 5:
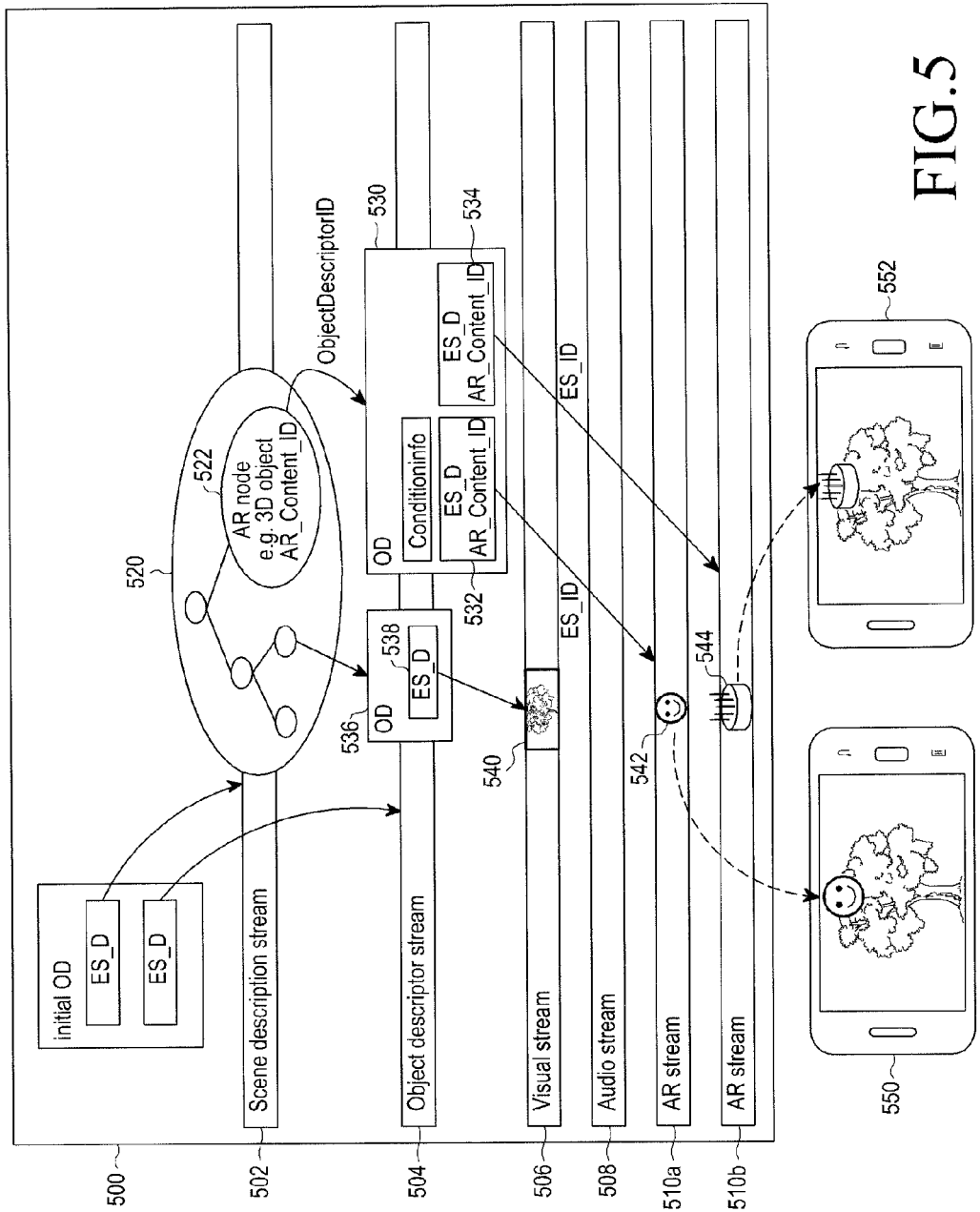
FIG. 5 illustrates an AR file framework to provide a plurality of pieces of AR content according to an exemplary embodiment of the present invention.

FIG. 5 illustrates an AR file framework to provide a plurality of pieces of AR content according to an exemplary embodiment of the present invention.

Referring to FIG. 5, an AR file framework 500 includes a scene description stream 502, an object descriptor stream 504, audio and/or visual streams 506 and 508, and a plurality of AR streams 510a and 510b.

A scene description 520 in the scene description stream 502 includes an AR node 522 that provides information about an AR locator. The AR node 522 describes when AR content 542 and 544 appear and how a real-world medium 540 is augmented by the AR content 542 and 544, as illustrated in ARs 550 and 552. The real-world medium 540 is carried in the elementary stream 506 indicated by an elementary stream descriptor 538 included in an object descriptor 536. The AR locator may be bonded to various pieces of AR content 542 and 544. The different pieces of AR content 542 and 544 are distinguished by their unique AR_Content_IDs.

The AR content 542 and 544 is described by an object descriptor 530 identified by ObjectDescriptorID in the AR node 522. That is, the object descriptor 530 includes Elementary Stream Descriptors (ES_Ds) 532 and 534 indicating the elementary streams 510a and 510b that carry the AR content 542 and 544 for the AR node 522. The AR locator provides AR_Content_IDs corresponding to one or more pieces of AR content selected for AR and the elementary stream descriptors 532 and 534 indicate the AR streams 510a and 510b based on the AR_Content_IDs.

AR content having AR_Content_IDs may be bonded to the AR locator. The AR container generator may request some AR content to some AR locator. The selected/customized AR content may be provided to the AR locator. If the AR locator preliminarily determines specific times and places at which the AR content is selected, AR_Content_IDs may be requested. The elementary stream descriptors 532 and 534 having the AR_Content_IDs in the object descriptor 530 indicate AR streams carrying the selected AR content.

Table 1 below illustrates the syntax of an elementary stream descriptor having an AR_Content_ID according to an exemplary embodiment of the present invention. For the meanings of other information, reference may be made to section 7.2.6.5 of ISO/IEC 14496-1.

TABLE 1

```
class ES_Descriptor extends BaseDescriptor : bit(8) tag=ES_DescrTag
{
 bit(16) ES_ID;
 bit(16) AR_Content_ID;
 bit(1) streamDependenceFlag;
 bit(1) URL_Flag;
 bit(1) OCRstreamFlag;
 bit(5) streamPriority;
 if (streamDependenceFlag)
 bit(16) dependsOn_ES_ID;
 if (URL_Flag) {
 bit(8) URLlength;
 bit(8) URLstring[URLlength];
 }
 if (OCRstreamFlag)
 bit(16) OCR_ES_Id;
 DecoderConfigDescriptor decConfigDescr;
 if (ODProfileLevelIndication==0x01) //no SL extension.
 {
 SLConfigDescriptor slConfigDescr;
 }
 else    // SL extension is possible.
 {
 SLConfigDescriptor slConfigDescr;
 }
 IPI_DescrPointer ipiPtr[0 .. 1];
 IP_IdentificationDataSet ipIDS[0 .. 255];
 IPMP_DescriptorPointer ipmpDescrPtr[0 .. 255];
 LanguageDescriptor langDescr[0 .. 255];
 QoS_Descriptor qosDescr[0 .. 1];
 RegistrationDescriptor regDescr[0 .. 1];
 ExtensionDescriptor extDescr[0 .. 255];
}
```

Referring to Table 1, ES_Descriptor carries all information related to a specific elementary stream, defined by a class tag identified by ES_DescrTag in a list of descriptor tags.

ES_ID provides a unique label to the elementary stream, and AR_Content_ID identifies AR content used for augmentation.

StreamDependenceFlag indicates whether dependsOn_ES_ID follows. URL_Flag is a flag indicating the presence or absence of URLstring and streamPriority specifies a relative value of the priority of the elementary stream. That is, an elementary stream having a high stream priority level is more important than an elementary stream having a low stream priority level. dependsOn_ES_ID is the ES_ID of another elementary stream on which the elementary stream is dependent. The elementary stream having the dependsOn_ES_ID may be associated with the object descriptor. URLstring provides a URL indicating the position of another stream, particularly an elementary stream having AR content by a name.

DecoderConfigDescriptor provides information about a decoder type and decoder resources required for the elementary stream. SLConfigDescriptor defines the structure of a Sync Layer (SL) header in the elementary stream. IP_IdentificationDataSet identifies the IP of content. Content types may include audio, visual, and scene description data and a plurality of IP_IdentificationDataSets may be associated with one elementary stream.

IPI_DescrPointer includes reference information about an elementary stream having an IP_IdentificationDataSet(s) valid to the stream. QoS_Descriptor includes requirements for a transport channel and a description of traffic to be generated by the elementary stream. RegistrationDescriptor provides a method of identifying formats of a private data stream uniquely and clearly. ExtensionDescriptor may include additional information about the elementary stream.

In the exemplary embodiment of the present invention, the object descriptor may further include ConditionInfo that provides condition information about other pieces of AR content. Table 2 and Table 3 illustrate syntaxes of an object descriptor according to exemplary embodiments of the present invention.

TABLE 2

```
class ObjectDescriptor extends ObjectDescriptorBase : bit
(8)
tag=ObjectDescrTag {
 bit(10) ObjectDescriptorID;
 bit(1) URL_Flag;
 bit(3) ConditionInfo
 const bit(2) reserved=0b11.1;
 if (URL_Flag) {
 bit(8) URLlength;
 bit(8) URLstring[URLlength];
 } else {
 ES_Descriptor esDescr[1 .. 255];
 OCI_Descriptor ociDescr[0 .. 255];
 IPMP_DescriptorPointer ipmpDescrPtr[0 .. 255];
 IPMP_Descriptor ipmpDescr [0 .. 255];
 }
 ExtensionDescriptor extDescr[0 .. 255];
}
```

TABLE 3

```
class ObjectDescriptor extends ObjectDescriptorBase : bit
(8)
tag=ObjectDescrTag {
 bit(10) ObjectDescriptorID;
 bit(1) URL_Flag;
 const bit(5) reserved=0b1111.1;
 if (URL_Flag) {
 bit(8) URLlength;
 bit(8) URLstring[URLlength];
 } else {
 bit(3) ConditionInfo
 const bit(13) reserved=0b111111111111.1;
 ES_Descriptor esDescr[1 .. 255];
 OCI_Descriptor ociDescr[0 .. 255];
 IPMP_DescriptorPointer ipmpDescrPtr[0 .. 255];
 IPMP_Descriptor ipmpDescr [0 .. 255];
 }
 ExtensionDescriptor extDescr[0 .. 255];
}
```

Referring to Table 2 and Table 3, the object descriptor is identified by ObjectDescriptorID and includes ConditionInfo providing condition information about AR content after URL_Flag.

ES_Descriptor is an elementary descriptor that may be configured as illustrated in Table 1, for example. OCI_Descriptor denotes an array of Object Content Information (OCI) descriptors related to media objects described by the object descriptor. IPMP_DescriptorPointer and IPMP_Descriptor provide information about IP Management and Protection (IPMP).

Values of ConditionInfo according to exemplary embodiments of the present invention have the following meanings:
  000: unknown;
  001: one of different pieces of AR content may be selected;

010: an AR content set may be used by an AR locator, for example, overlapped; and 011: AR content may appear sequentially from the AR locator.

For the meanings of other information, reference may be made to section 7.2.6.3 of ISO/IEC 14496-1.

Different providers may provide AR content and the AR content may be carried in a different file from a real-world medium. For example, different pieces of advertisement content may be provided in the same soccer match. In this case, the different pieces of advertisement content may be delivered in different files.

Figure 6:
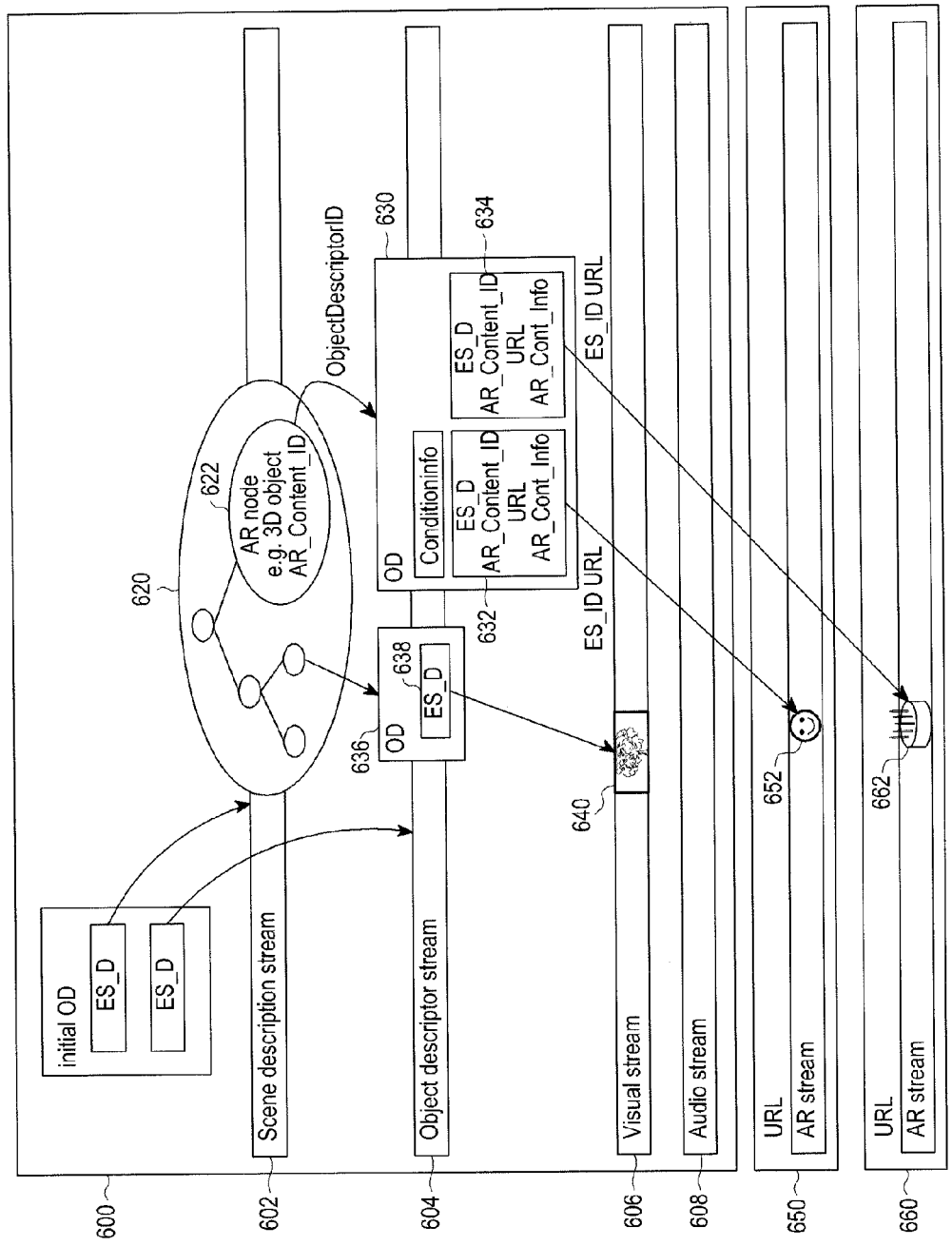
FIG. 6 illustrates an AR file framework according to an exemplary embodiment of the present invention.

FIG. 6 illustrates an AR file framework according to an exemplary embodiment of the present invention. Herein, a plurality of pieces of AR content exist in different files from a real-world medium.

Referring to FIG. 6, a first file 600 includes a scene description stream 602, an object descriptor stream 604, and audio and/or visual streams 606 and 608. A real-world medium 640 exists in the visual stream 606 of the first file 600. Second and third files 650 and 660 provide AR streams having different pieces of AR content 652 and 662. The first file 600 including the real-world medium 640 may be provided by provider A, and the two files 650 and 660 including the two pieces of AR content 652 and 662 may be provided respectively by providers B and C.

The elementary stream 606 carrying the real-world medium 640 is indicated by an elementary stream descriptor 638 of an object descriptor 636. A scene description 620 in the scene description stream 602 includes an AR node 622 that provides information about an AR locator. The AR node 622 describes when the AR content 652 and 662 of the files 650 and 660 appear and how the real-world medium 640 is augmented by the AR content 652 and 662.

The AR content 652 and 662 is described by an object descriptor 630 identified by ObjectDescriptorID in the AR node 622. The object descriptor 630 includes Elementary Stream Descriptors (ES_Ds) 632 and 634 indicating elementary streams that carry the AR content 652 and 662. The elementary stream descriptors 632 and 634 includes AR_Content_IDs that uniquely identify the AR content 652 and 662.

The AR content 652 and 662 is indicated by ES_IDs and URLs included in the elementary stream descriptors 632 and 634. The elementary stream descriptors 632 and 634 may further include AR_Cont_Info to provide some information about the AR content 652 and 662, for example, the names of providers.

Table 4 below illustrates an exemplary syntax of an elementary stream descriptor according to the above exemplary embodiment of the present invention.

TABLE 4

```
class ES_Descriptor extends BaseDescriptor : bit(8) tag=ES_DescrTag
{
    bit(16) ES_ID;
    bit(1) streamDependenceFlag;
    bit(1) URL_Flag;
    bit(1) OCRstreamFlag;
    bit(5) streamPriority;
    if (streamDependenceFlag)
    bit(16) dependsOn_ES_ID;
    if (URL_Flag) {
    bit(8) URLlength;
    bit(8) URLstring[URLlength];
    bit(8) AR_Cont_Info_Length;
    bit(8) AR_Cont_Infostring[AR_Cont_Info_Length]
    }
```

TABLE 4-continued

```
    if (OCRstreamFlag)
    bit(16) OCR_ES_Id;
    DecoderConfigDescriptor decConfigDescr;
    if (ODProfileLevelIndication==0x01) //no SL extension.
    {
    SLConfigDescriptor slConfigDescr;
    }
    else      // SL extension is possible.
    {
    SLConfigDescriptor slConfigDescr;
    }
    IPI_DescrPointer ipiPtr[0 .. 1];
    IP_IdentificationDataSet ipIDS[0 .. 255];
    IPMP_DescriptorPointer ipmpDescrPtr[0 .. 255];
    LanguageDescriptor langDescr[0 .. 255];
    QoS_Descriptor qosDescr[0 .. 1];
    RegistrationDescriptor regDescr[0 .. 1];
    ExtensionDescriptor extDescr[0 .. 255];
    }
```

In Table 4, AR_Cont_Infostring may provide some information about AR content referenced by URLstring. The elementary stream descriptor may further include AR_Content_ID. For the syntax of other information, reference may be made to section 7.2.6.5 of ISO/IEC 14496-1.

In another exemplary embodiment, if a real-world medium provider does not provide specific information about AR content, the provider of the AR content may provide an object descriptor related to the AR content directly.

Figure 7:
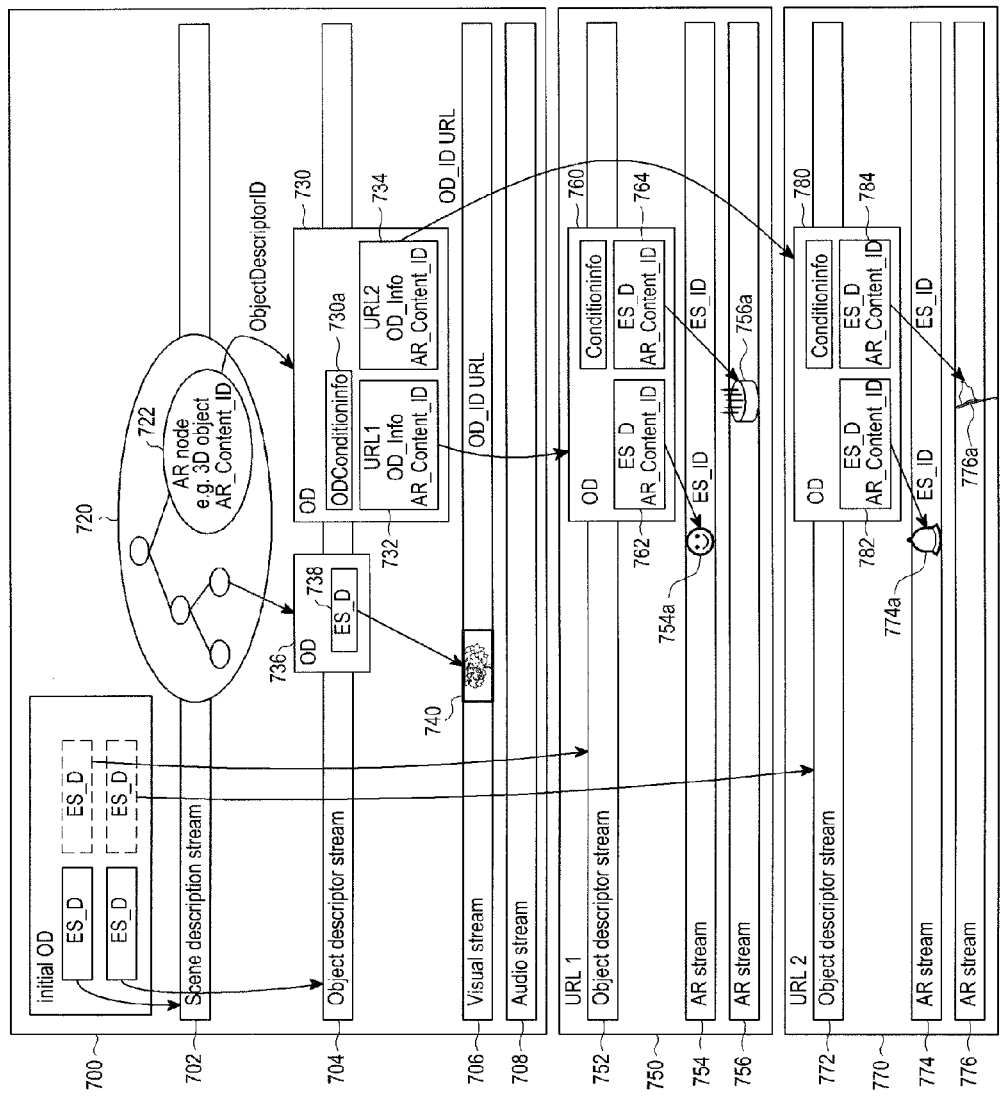
FIG. 7 illustrates an AR file framework according to an exemplary embodiment of the present invention.

FIG. 7 illustrates an AR file framework according to an exemplary embodiment of the present invention. Herein, a plurality of pieces of AR content exist in different files from a real-world medium.

Referring to FIG. 7, a first file 700 includes a scene description stream 702, an object descriptor stream 704, and audio and/or visual streams 706 and 708. A real-world medium 740 exists in the visual stream 706 of the first file 700 and may be combined with at least one of a plurality of pieces of AR content 754a, 756a, 774a and 776a carried in files 750 and 770 provided by others.

The second file 750 provides one or more AR streams 754 and 756 having the one or more pieces of AR content 754a and 756a. The second file 750 further provides an object descriptor stream 752 including an object descriptor 760 that describes the AR content 754a and 756a. Similarly, the third file 770 provides one or more AR streams 774 and 776 having the one or more pieces of AR content 774a and 776a. The third file 770 further provides an object descriptor stream 772 including an object descriptor 780 that describes the AR content 774a and 776a. The first file 700 including the real-world medium 740 may be provided by provider A, and the files 750 and 770 including the AR content 754a, 756a, 774a and 776a may be provided respectively by providers B and C.

The elementary stream 706 carrying the real-world medium 740 is indicated by an elementary stream descriptor 738 of an object descriptor 736. A scene description 720 in the scene description stream 702 includes an AR node 722 that provides information about an AR locator. The AR node 722 describes when the different pieces of AR content 754a, 756a, 774a and 776a of the files 750 and 770 appear and how the real-world medium 740 is augmented by the AR content 754a, 756a, 774a and 776a.

The AR content 754a, 756a, 774a and 776a is described indirectly by an object descriptor 730 identified by ObjectDescriptorID in the AR node 722. In the object descriptor 730, Elementary Stream Descriptors (ES_Ds) 732 and 734 include object descriptor information OD_Info indicating the object descriptors 760 and 780 in the files 750 and 770 carrying the AR content 754a, 756a, 774a and 776a. The object descriptor information OD_Info in the elementary stream descriptors 732 and 734 includes the IDs of the object descriptors uniquely indicating the object descriptors 760 and 780 having the AR content 754a, 756a, 774a and 776a, OD_IDs, URLs indicating the positions of the object descriptors 760 and 780, and AR_Content_IDs.

The object descriptor 760 of the second file 750 includes elementary stream descriptors 762 and 764 corresponding to the AR content 754a and 756a included in the second file 750 and additional condition information. The elementary stream descriptors 762 and 764 include AR_Content_IDs that uniquely identify the AR content 754a and 756a, respectively. Similarly, the object descriptor 780 of the third file 770 includes elementary stream descriptors 782 and 784 corresponding to the AR content 774a and 776a included in the third file 770 and additional condition information. The elementary stream descriptors 782 and 784 include AR_Content_IDs that uniquely identify the AR content 774a and 776a, respectively.

In an exemplary embodiment of the present invention, the object descriptor 730 for the AR node 722 in the first file 700 signals the addresses, that is, URLs of the object descriptors 760 and 780 of the files 750 and 770. There may exist one or more object descriptors 760 and 780 provided by others having different URLs. Some information about the object descriptors 760 and 780 delivered from the different URLs may be described by OD_Info included in the object descriptor 730 of the first file 700. Additionally, the object descriptor 730 may list the AR_Content_ID of each piece of AR content with respect to a URL and may further include condition information 730a describing the relationship between the different object descriptors 730, 760 and 780, ODConditionInfo.

Table 5 illustrates an exemplary syntax of the object descriptor 730 including the condition information 730a, ODConditionInfo.

TABLE 5

```
class ObjectDescriptor extends ObjectDescriptorBase : bit
(8)
tag=ObjectDescrTag {
  bit(10) ObjectDescriptorID;
  bit(1) URL_Flag;
  bit(3) ConditionInfo
  const bit(2) reserved=0b1.1;
  bit(16) URL_Numb;
  if (URL_Flag) {
    bit(3) ODConditionInfo
    const bit(13) reserved=0b111111111111.1;
    for(i<=URL_Numb){
      bit(8) URLlength;
      bit(8) URLstring[URLlength];
      bit(8) OD_Info_Length;
      bit(8) OD_Infostring[OD_Info_Length];
      bit(16) AR_Content_Numb
      for(j<= AR_Content_Numb){
        bit(16) AR_Content_ID
      }
    }
  } else {
    ES_Descriptor esDescr[1 .. 255];
    OCI_Descriptor ociDescr[0 .. 255];
    IPMP_DescriptorPointer ipmpDescrPtr[0 .. 255];
    IPMP_Descriptor ipmpDescr [0 .. 255];
  }
  ExtensionDescriptor extDescr[0 .. 255];
}
```

Referring to Table 5, the object descriptor 730 includes URL_Numb indicating the number of URLs, as many URL-lengths and URLstrings as URL_Numb, AR_Content_Numb indicating the number of AR_Content_IDs, and as many AR_Content_IDs as AR_Content_Numb. The object descriptor 730 further includes ODConditionInfo.

In an exemplary embodiment, ODConditionInfo may be defined as follows:
  000: unknown;
  001: one OD URL may be selected from a set of OD URLs; and
  010: the set of OD URLs may be used by an AR locator, for example, overlapped.

The elementary stream descriptors 732 and 734 for the object descriptor streams 752 and 772 of the files 750 and 770 may be listed in the object descriptor 730 of the object descriptor stream 704, while elementary stream descriptors for the scene description stream 702 and the object descriptor stream 704 are listed in an initial object descriptor.

If a device wants to store a real-world medium having an object descriptor selected from another file, the device may replace a previous object descriptor with the selected object descriptor and copy an AR stream to a current file having the real-world medium. In this manner, a new file is generated using an original real-world medium and selected AR content.

Figure 8:
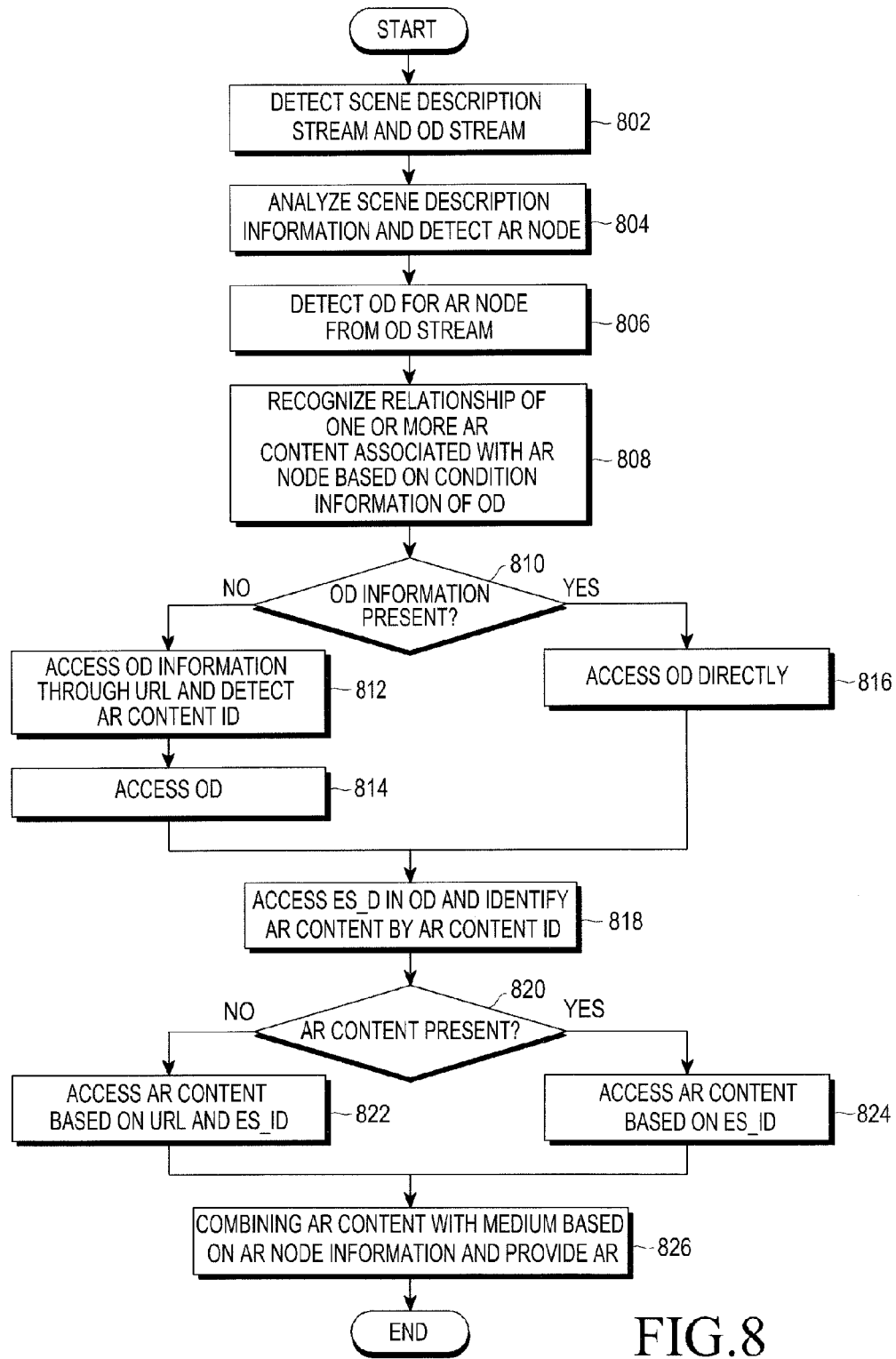
FIG. 8 is a flowchart illustrating an operation of a device according to an exemplary embodiment of the present invention.

FIG. 8 is a flowchart illustrating an operation of a device according to an exemplary embodiment of the present invention.

Referring to FIG. 8, the device accesses a file having a real-world medium to be augmented and detects a scene description stream and an object descriptor stream in the file according to an initial object descriptor included in the file in step 802. In step 804, the device analyzes a scene description in the scene description stream and acquires information about an AR node included in the scene description. That is, the device may detect from the AR node information about an AR locator that describes when a virtual object will appear and how the virtual object will be combined with the real-world medium.

In step 806, the device detects an object descriptor for the AR node from the object descriptor stream based on an ObjectdescriptorID. In the presence of one or more pieces of AR content associated with the AR node, the device may be aware of the relationship and existence of the one or more AR content associated with the AR node based on condition information ConditionInfo included in the object descriptor in step 808. In addition, the device may request at least one piece of AR content associated with the AR node based on an AR_Content_ID included in the AR node.

In step 810, the device determines whether object descriptor information describing the associated at least one AR content is included in the current file.

If the object descriptor information is carried in another file by a different provider, for example, the device may detect a URL being an address at which an associated object descriptor may be accessed, OD_Info, and an AR_Content_ID of the AR content to be accessed in step 812. In step 814, the device accesses each object descriptor carrying AR content based on the detected AR_Content_ID and OD_Info and acquires necessary information from the object descriptor.

On the other hand, if it is determined that the object descriptor information is carried in the current file in step 810, the device accesses the object descriptor information associated with the AR content from the current file in step 816. In step 818, the device accesses an elementary stream descriptor in the object descriptor associated with the AR content and acquires an AR_Content_ID and, when needed, a URL from the elementary stream descriptor.

The device determines whether the AR content is carried in the current file in step 820. If the AR content is carried in a different file by a different provider, the device accesses the AR content based on the URL and an elementary stream ID, ES_ID identifying an elementary stream containing the AR content, acquired from the elementary stream descriptor in step 822. If the AR content is carried in the current file, the device accesses the AR content based on the ES_ID acquired from the elementary stream descriptor in step 824. In step 826, the device augments the real-world medium with the AR content or AR content selected from an AR content set and upon request, visualizes the augmented real-world medium to the user.

Figure 9:
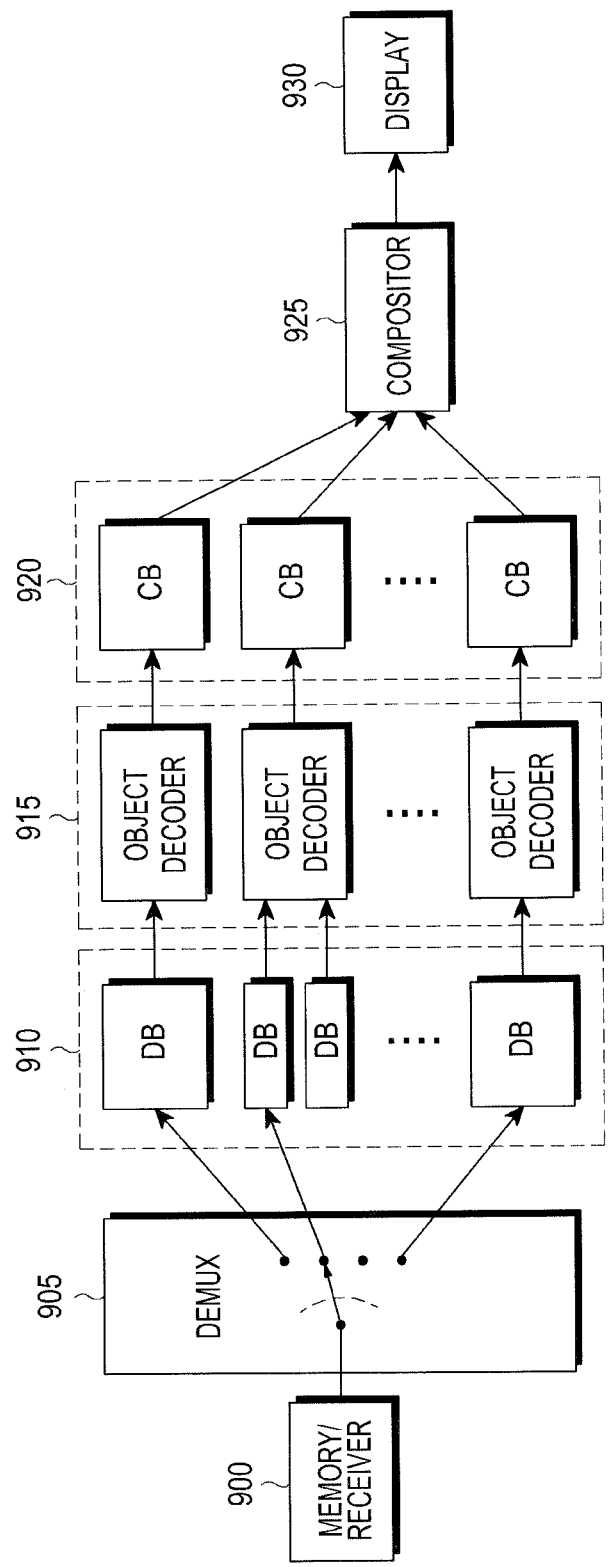
FIG. 9 is a block diagram of a system decoder model according to an exemplary embodiment of the present invention.

FIG. 9 is a block diagram of a system decoder model according to an exemplary embodiment of the present invention.

Referring to FIG. 9, the system decoder model includes a Demultiplexer (DEMUX) 905, a plurality of Decoding Buffers (DBs) 910, a plurality of object decoders 915, a plurality of composition memories 920, and a compositor 925. Each component may be configured as one or more processors or a plurality of components may be integrated into a single processor.

The DEMUX 905 separates a scene description stream, an object descriptor stream, and media streams that are built in packets by analyzing file streams of at least one file read from a memory 900 or received from a server wirelessly or by wire through a receiver 900. The separated streams are buffered in corresponding DBs 910.

The object decoders 915 extract the packets of the elementary streams buffered in the DBs 910 corresponding to the object decoders 915 on a predetermined decoding unit basis and decode the packets according to encoding schemes of media corresponding to the packets. More particularly, a specific decoder analyzes a scene description included in the scene description stream and thus detects information about at least one piece of AR content according to one of the afore-described exemplary embodiments of the present invention. At least one object decoder 915 may be connected to a plurality of DBs 910. The composition memories 920 store the data decoded by the object decoders 915 in predetermined composition units. The compositor 925 combines the data stored in the composition memories 920 according to a predetermined criterion. For example, the compositor 925 augments a real-world object, extracted from a media stream and decoded, with a virtual object, extracted from an AR stream and decoded, and displays the augmented real-world object on a display 930.

Figure 10:
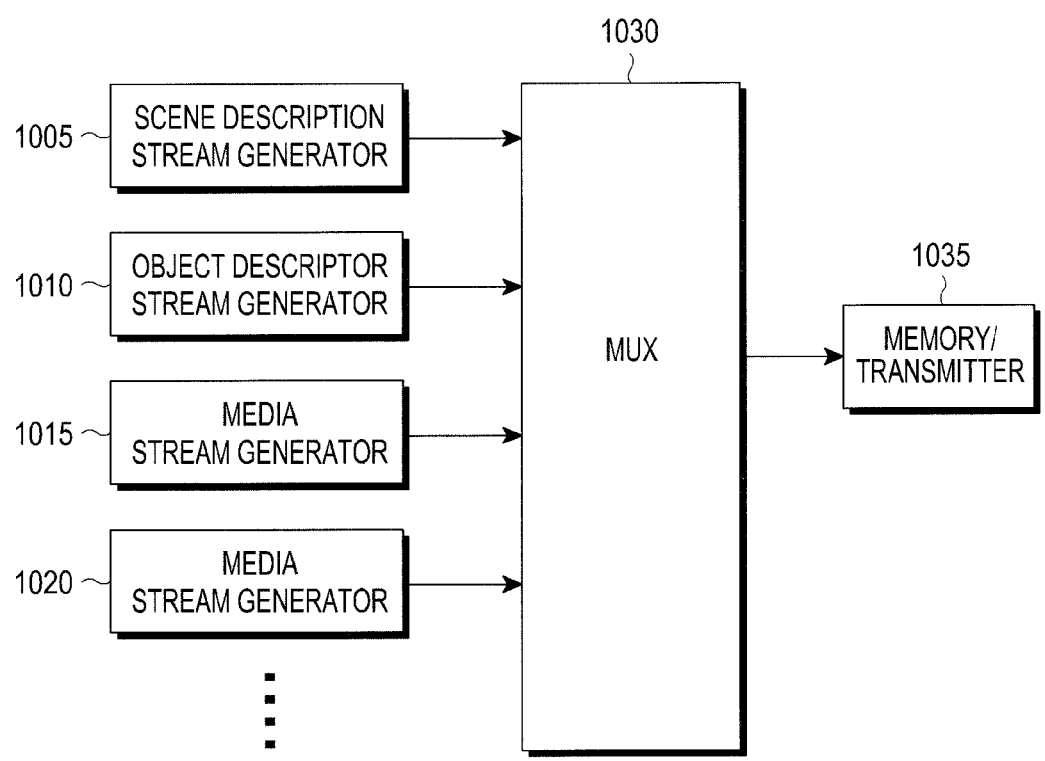
FIG. 10 is a block diagram of a file provider according to an exemplary embodiment of the present invention.

FIG. 10 is a block diagram of a file provider according to an exemplary embodiment of the present invention.

Referring to FIG. 10, a provider server includes a scene description generator 1005 and an object descriptor stream generator 1010. The provider server may further include one or more media stream generators 1015 and 1020 corresponding to audio and/or visual content. In another exemplary embodiment, the media stream generators 1015 and 1020 may reside in another server or within a device.

The scene description generator 1005 and the object descriptor stream generator 1010 generate a scene description stream containing at least one scene description and an object descriptor stream containing an object descriptor.

A Multiplexer (MUX) 1030 multiplexes the scene description stream and the object descriptor stream, and, when needed, media streams from the media stream generators 1015 and 1020 into one file and stores the file in a memory 1035 or, upon request, transmits the file to the device through a transmitter 1035.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of processing data to support Augmented Reality (AR), the method comprising:
   receiving an image file including at least a scene description stream, an object descriptor stream, and a visual stream including a real-world medium, the scene description stream including an AR node that represents information about at least one piece of AR content used to augment the real-world medium;
   acquiring, by a processor, from the AR node, information about an AR locator and an object descriptor Identifier (ID), the AR locator describing when the at least one piece of AR content appears and how the real-world medium is augmented with the at least one piece of AR content and the object indicator ID identifying an Object Descriptor (OD) that describes the at least one piece of AR content;
   acquiring, by the processor, from the OD identified by the object descriptor ID, at least one elementary stream descriptor that is associated with each elementary stream carrying the at least one piece of AR content and includes an ID of the at least one piece of AR content;
   accessing, by the processor, at least one elementary stream carrying the at least one piece of AR content based on the at least one elementary stream descriptor; and
   augmenting, by a display, the real-world medium with AR content selected from the at least one piece of AR content and outputting the augmented real-world medium.

2. The method of claim 1, wherein the elementary stream descriptor includes an elementary stream ID identifying an elementary stream carrying the AR content and an AR content ID identifying the AR content.

3. The method of claim 2, wherein the object descriptor further includes condition information indicating a use condition for an AR content set.

4. The method of claim 1, wherein, if the AR content is carried in an AR stream in another file, the elementary stream descriptor includes an elementary stream ID indicating the AR stream, an AR content ID identifying the AR content, a Uniform Resource Locator (URL) indicating the position of the AR stream, and AR condition information including additional information about the AR content.

5. The method of claim 4, wherein the object descriptor further includes condition information indicating a use condition for an AR content set.

6. The method of claim 1, wherein, if the AR content and an AR object descriptor describing the AR content are carried in another file, the elementary stream descriptor included in the object descriptor includes a Uniform Resource Locator (URL) indicating the position of an object descriptor stream carrying the AR object descriptor, object descriptor information about the AR object descriptor, and an AR content ID identifying the AR content, and
   wherein the AR object descriptor includes an AR elementary stream descriptor associated with the AR content and the AR elementary stream descriptor includes an elementary stream ID indicating an AR stream carrying the AR content and the AR content ID identifying the AR content.

7. The method of claim 6, wherein the object descriptor further includes object descriptor condition information indicating a use condition for a set of object descriptors, and wherein the AR object descriptor further includes condition information indicating a use condition for an AR content set.

8. An apparatus of processing data to support Augmented Reality (AR), the apparatus comprising:

a receiver configured to receive an image file including at least a scene description stream, an object descriptor stream, and a visual stream including a real-world medium, the scene description stream including an AR node that represents information about at least one piece of AR content used to augment the real-world medium;

a processor configured to acquire, from the AR node, information about an AR locator and an object descriptor Identifier (ID), the AR locator describing when the at least one piece of AR content appears and how the real-world medium is augmented with the at least one piece of AR content and the object indicator ID identifying an Object Descriptor (OD) that describes the at least one piece of AR content, to acquire, from the OD identified by the object descriptor ID, at least one elementary stream descriptor that is associated with each elementary stream carrying the at least one piece of AR content and includes an ID of the at least one piece of AR content, and to access at least one elementary stream carrying the at least one piece of AR content based on the at least one elementary stream descriptor; and a display configured to augment the real-world medium with AR content selected from the at least one piece of AR content and to output the augmented real-world medium.

9. The apparatus of claim 8, wherein the elementary stream descriptor includes an elementary stream ID identifying an elementary stream carrying the AR content and an AR content ID identifying the AR content.

10. The apparatus of claim 8, wherein, if the AR content is carried in an AR stream in another file, the elementary stream descriptor includes an elementary stream ID indicating the AR stream, an AR content ID identifying the AR content, a Uniform Resource Locator (URL) indicating the position of the AR stream, and AR condition information including additional information about the AR content.

11. The apparatus of claim 10, wherein the object descriptor further includes condition information indicating a use condition for an AR content set.

12. The apparatus of claim 9, wherein the object descriptor further includes condition information indicating a use condition for an AR content set.

13. The apparatus of claim 8, wherein, if the AR content and an AR object descriptor describing the AR content are carried in another file, the elementary stream descriptor included in the object descriptor includes a Uniform Resource Locator (URL) indicating the position of an object descriptor stream carrying the AR object descriptor, object descriptor information about the AR object descriptor, and an AR content ID identifying the AR content, and wherein the AR object descriptor includes an AR elementary stream descriptor associated with the AR content and the AR elementary stream descriptor includes an elementary stream ID indicating an AR stream carrying the AR content and the AR content ID identifying the AR content.

14. The apparatus of claim 13, wherein the object descriptor further includes object descriptor condition information indicating a use condition for a set of object descriptors, and wherein the AR object descriptor further includes condition information indicating a use condition for an AR content set.

* * * * *